United States Patent [19]

Dunn et al.

[11] Patent Number: 5,055,361
[45] Date of Patent: * Oct. 8, 1991

[54] BONDED CERAMIC-METAL ARTICLE

[75] Inventors: Edmund M. Dunn, Lexington; Kang, Shinhoo, Wayland; George C. Wei, Weston, all of Mass.

[73] Assignee: GTE Laboratories Incorporated, Waltham, Mass.

[*] Notice: The portion of the term of this patent subsequent to Nov. 28, 2006 has been disclaimed.

[21] Appl. No.: 324,844

[22] Filed: Mar. 17, 1989

[51] Int. Cl.[5] .................. B32B 15/04; B23K 31/02
[52] U.S. Cl. .................................. 428/633; 228/122; 228/126; 428/212; 428/220; 428/434; 428/621; 428/632; 428/688; 428/697; 428/699
[58] Field of Search ............ 428/632, 630, 627, 212, 428/433, 469, 621, 434, 633

[56] References Cited

U.S. PATENT DOCUMENTS

| | | | |
|---|---|---|---|
| 3,923,551 | 12/1975 | Purdy et al. | 228/122 |
| 4,098,612 | 7/1978 | Rhodes et al. | |
| 4,115,134 | 9/1978 | Rhodes . | |
| 4,147,744 | 4/1979 | Rhodes . | |
| 4,166,831 | 9/1979 | Rhodes et al. | |
| 4,180,700 | 12/1979 | Kraska et al. | 228/122 |
| 4,545,799 | 10/1985 | Rhodes et al. | |
| 4,591,535 | 5/1986 | Mizuhara | 428/632 |
| 4,678,720 | 7/1987 | Hsu et al. | 228/263.18 |
| 4,678,868 | 7/1987 | Kraska et al. | 228/122 |
| 4,698,271 | 10/1987 | Moorhead | 428/632 |
| 4,763,828 | 8/1988 | Fukaya et al. | 228/124 |
| 4,883,217 | 11/1989 | Dunn et al. | 228/122 |
| 4,883,218 | 11/1989 | Dunn et al. | 228/122 |

FOREIGN PATENT DOCUMENTS 0090875 5/1985 Japan .
0231472 11/1985 Japan .
2296959 12/1987 Japan .

OTHER PUBLICATIONS

G. C. Wei, M. R. Pascucci, E. A. Trickett, C. Brecher, and W. H. Rhodes, "Lanthana-Strengthened Yttria Domes and windows," SPIE Proc.968, 5-13 (1988).
G. C. Wei, C. Brecher, M. R. Pascucci, E. A. Trickett, and W. H. Rhodes, "Characterization of Lanthana-Strengthened Yttria Infrared Transmitting Materials," SPIE Proc. 929, 50-55 (1988).
G. C. Wei, M. R. Pascucci, C. Brecher, E. A. Trickett, and W. H. Rhodes, "Properties of Lanthana-Strengthened Yttria Infrared Transmitting Windows," Proc. 19th Symposium on Electromagnetic Windows, pp. 106-115, Atlanta, Ga. (Sep. 1988).

(List continued on next page.)

Primary Examiner—Ellis P. Robinson
Assistant Examiner—Archene A. Turner
Attorney, Agent, or Firm—Carl F. Ruoff

[57] ABSTRACT

A new and improved bonded ceramic-metal article and the method of making the article is described. The ceramic-metal article comprises a ceramic article, such as a lanthana-strengthened yttria article, bonded to a metal article, such as niobium, by a layer of a brazing material to form a bonded ceramic-metal article. The method of bonding the ceramic article to the metal article comprises placing the brazing alloy, such as a brazing alloy consisting essentially of 63% by weight silver, 35.25% by weight copper, and 1.75% by weight titanium, between the lanthana-strengthened yttria article and the niobium article and heating the layered structure in vacuum at about 50 degrees centigrade above the liquidus temperature of the brazing alloy for a period of about 5 minutes. Another method of bonding the ceramic article comprises coating a surface of the lanthana-strengthened yttria article with a group IVB metal, such as titanium, hafnium, and zirconium then placing a different brazing alloy, such as a brazing alloy consisting essentially of 72% by weight silver and 28% by weight copper or a brazing alloy consisting essentially of 82% by weight gold and 18% by weight nickel, between the coated lanthana-strengthened yttria article and the niobium article and heating the layered structure in vacuum at about 50 degrees centigrade above the liquidus temperature of the brazing alloy for a period of about 5 minutes.

15 Claims, 2 Drawing Sheets

OTHER PUBLICATIONS

W. G. Rhodes, G. C. Wei, and E. A. Trickett, "Lanthana-Doped Yttria: A New Infrared Window Material," SPIE Proc. 683, 12–18 (1986).

W. H. Rhodes, "Controlled Transient Solid Second-Phase Sintering of Yttria," J. Am. Ceram. Soc. 64[1]12 (1981).

E. M. Dunn, S. Kang, H. Mizuhara, K. S. Kim, "Analytical and Experimental Evaluation of Joining Silicon Nitride to Metal Silicon Carbide to Metal," *Proceedings of the Twenty-Sixth Automative Technology Development Contract Coordination Meeting*, Dearborn, Mich., Oct. 24–27, 1988, Society of Automotive Engineers, Inc., Warrendale, Pa. Submitted for Publication.

S. K. Choi, L. Froyen, and M. J. Brabers in *High Tech Ceramics*, ed. P. Vincensini, Elsevier Science Pub., 1987, p. 407–413.

D. F. Smith, "Low Expansion Superalloys," A Technical Report from Huntington Alloys.

D. F. Smith and E. F. Clatworthy, "The Development of High Strength, Low Expansion Alloys," *Metal Progress*, Mar. 1981.

Y. S. Touloukian, R. K. Kirby, R. E. Taylor, and P. D. Desai, ed., "Thermophysical Properties of Matter", v. 12, p. 236 (1975), IFE/Plenum, N.Y.

G. E. Quinn, W. R. Braue, "Fracture Mechanism Maps for Advanced Structural Ceramics Part II Sinter Silicon Nitride" J. of Mat. Sci. 25, 4377–4392 (1990).

W. E. Lee, C. H. Drummond III, G. E. Hilmas, S. Kumar "Microstructural Evolution in Near-Eutectic Yttrium Silicate Compositions Fabricated from a Bulk Melt and as an Intergranular Phase in Silicon Nitride" J. Am. Cer. Soc. 73 No. 12, pp. 3575–3579, 1990.

R. E. Loehman, "Preparation and Properties of Yttrium-Silicon-Aluminum Oxynitride Glasses" J. Am. Cer. Soc. 62 No. 9–10 pp. 491–494 (1979).

GTE Brochure outlining properties of various ceramics.

BONDED CERAMIC-METAL ARTICLE

CROSS-REFERENCE TO RELATED APPLICATION

Co-pending patent application, U.S. Pat. No. 4,883,217 entitled "A METHOD OF BONDING A CERAMIC ARTICLE TO A METAL ARTICLE" and co-pending patent application, U.S. Pat. No. 4,883,218, entitled "A METHOD OF BRAZING A CERAMIC ARTICLE TO A METAL ARTICLE," both filed concurrently herewith, and both assigned to GTE Laboratories Incorporated, assignee of the present application, concern related subject matter of this application.

FIELD OF THE INVENTION

This invention relates to a ceramic article joined to a a metal article and a method thereof. More particularly, this invention relates to an yttria article bonded to a metal article.

BACKGROUND OF THE INVENTION

In the joining of relatively brittle materials such as ceramics, brazing with ductile braze alloys is useful in accommodating residual stress from differential expansion. It has been previously demonstrated that niobium to yttria based material joints can be made successfully with a shrinkage fit and diffusion bonding as described in U.S. Pat. No. 4,545,799 to Rhodes et al. However, diffusion bonding has a number of disadvantages in that the joint configuration may make it difficult to apply the necessary pressure (shrinkage) and the tolerances needed for a reliable joint are very tight.

Frit seals based on calcium aluminate were also applied to the joining of a lanthana-strengthened yttria (LSY) article to another LSY article or to a niobium article (1 w/o Zr-doped for high pressure sodium lamp applications. However, this technique has been limited to relatively small parts (approximately 10 mm diameter by 0.8mm thick tube). Although these LSY to Nb frit seals have remained vacuum tight after several thousand thermal cycles, it is believed that large joints associated with windows and domes may require a braze capable of undergoing plastic deformation.

SUMMARY OF THE INVENTION

In accordance with one aspect of the present invention, a new and improved ceramic-metal article comprises a ceramic article bonded to a metal article by a layer of brazing material. The ceramic-metal article has a service temperature. The ceramic article has a liquidus temperature a solidus temperature, and a coefficient of thermal expansion. The ceramic article comprises an yttria based ceramic. The metal article has a liquidus temperature, a solidus temperature, and a coefficient of thermal expansion. The braze material comprises a ductile metal which contains a group IVB metal and has a liquidus temperature less than the solidus temperature of the ceramic article and the solidus temperature of the metal article. The braze material has a solidus temperature above the service temperature of the ceramic-metal article.

In accordance with another aspect of the present invention, a new and improved ceramic-metal article comprises a ceramic article bonded to a metal article by a layer of brazing material. The ceramic-metal article has a service temperature. The ceramic article has a liquidus temperature, a solidus temperature, and a coefficient of thermal expansion. The ceramic article comprises an yttria based ceramic selectively coated with a group IVB metal. The metal article has a liquidus temperature, a solidus temperature, and a coefficient of thermal expansion. The braze material comprises a ductile metal and has a liquidus temperature less than the solidus point temperature of the ceramic article and the solidus temperature of the metal article. The braze material has a solidus temperature above the service temperature of the ceramic-metal article.

Figure 1:
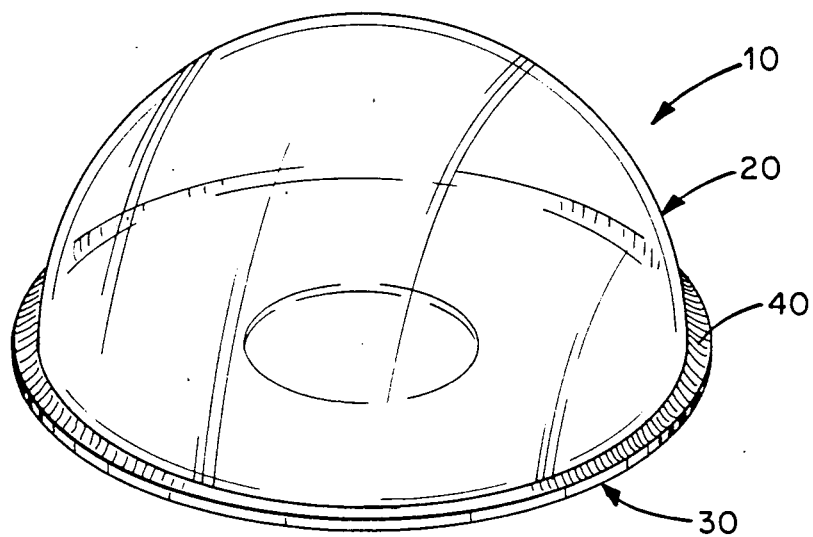
FIG. 1 is a perspective view of an infrared transparent lanthana-strengthened yttria dome bonded to a metal article in accordance with the present invention.
Figure 2:
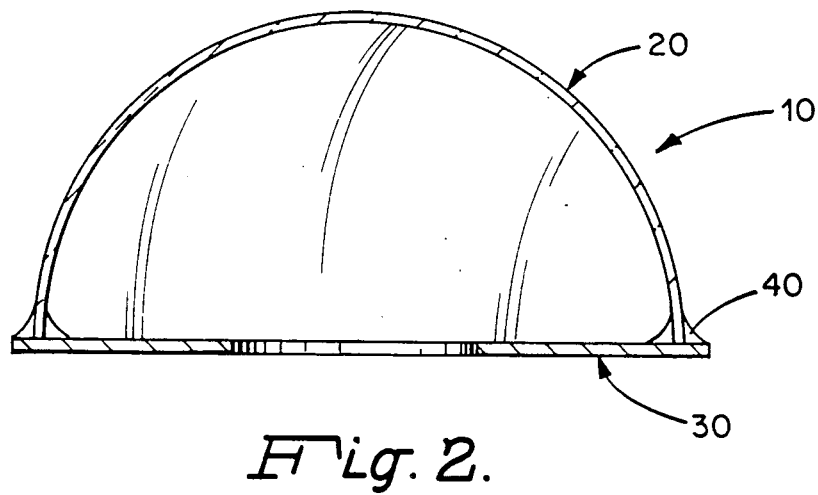
FIG. 2 is a cross sectional view of the infrared transparent lanthana-strengthened yttria dome bonded to a metal article depicted in FIG. 1 in accordance with the present invention.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENTS

Lanthana-strengthened yttria (LSY), approximately 3.2 mole percent to about 30 mole percent lanthana added to yttria, is a material with great potential for 3-5 microns infrared-transmitting window or dome applications. An important attribute of $La_2O_3$-strengthened yttria is it high transmissivity at wavelengths from 300 nm to 8 microns. The absorption coefficients of the most recent LSY material measured by laser calorimetry are 0.005–0.007 $cm^{-1}$ at 2.9 microns, and 0.004–0.005 $cm^{-1}$ at 3.9 microns, close to the intrinsic absorption coefficients ($10^{-3}$ to $10^{-4}$ $cm^{-1}$) indicated by the extrapolated multiphonon edge. High broadband transmittance and low scattering in the visible and infrared ranges (0.81±0.31% forward total integrated scattering. TIS. at 647 nm and 0.18±0.03% at 3.39 microns in 1.3 mm thick disks) have been achieved. The long wavelength cutoff and low absorption and scattering in LSY result in low emissivity, which leads to more tolerance for heating than other IR-transmitting oxides, without interference from phonon edge shift.

In addition, LSY has many attractive physical attributes. It has cubic symmetry and thus no birefringence, a high melting point (2464° C.). moderate thermal expansion coefficient ($7.9 \times 10^{-6}$/°C. between 20° C. and 1000° C.), and high strength. Toughening by means of controlled second-phase precipitation has been demonstrated. This has important implications for improving the resistance of LSY to thermal shock, and rain and dust erosion.

The fabrication of LSY starts with high-purity submicron powders that can be pressed into windows or domes to near net shape and consolidated to full density using a transient second-phase sintering technique without pressure as described by W. H. Rhodes. "Controlled Transient Solid Second-Phase Sintering of Yttria," J. Am. Ceram. Soc. 64[1] 12 (1981). This processing route results in efficient material usage and minimal grinding and polishing costs for the final, high-quality optical components. Progress in the processing technology of LSY in the past has led to successful fabrication of many, full-size, optical-quality domes and numerous property test specimens. The optical and thermomechanical properties have been characterized and a large data base established in the literature. The LSY material technology has reached the point where dome application feasibility has been demonstrated and full implementation requires (a) mechanical properties refinement, (b) improved process control, and (c) viable joint techniques for attaching domes or windows to other structural members of advanced systems. This invention is directed to the joining of LSY to metals using brazing alloys.

The joining of relatively brittle materials such as ceramics to metals is discussed in U.S. Pat. No. 4,545,799 to Rhodes et al. in which niobium to yttria joints can be made with a shrinkage fit and diffusion bonding. Diffusion bonding has a number of disadvantages in that the joint configuration may make it difficult to apply the necessary pressure (shrinkage) and the tolerances needed for a reliable joint are very tight. LSY has also been joined to niobium (1 w/o Zr-doped) using frit seals for high pressure sodium lamp applications. Although these LSY-to-Nb frit seals have remained vacuum tight after several thousand thermal cycles, it is believed that the larger joints associated with windows and domes may require a braze capable of undergoing plastic deformation.

Brazing is the preferred joining method because (1) it is hermetic, (2) braze ductility accommodates residual stress, and (3) joint tolerance requirements are not extremely stringent. The current invention teaches the brazing of yttria based ceramic to niobium yielding strong, tight joints with minimal preparation or fixturing.

Coatings were applied to LSY using electron beam evaporation to a thickness of about 3 microns at 300° C. Wetting behavior of the system was evaluated using conventional sessile drop tests. A drop of braze was melted on an LSY substrate in a vacuum furnace at a pressure of $10^{-5}$ torr. Contact angles were monitored as a about function of time with a video system equipped with a telephoto lens. The metallic component of the brazed couple (i.e., the structural, parent material) was screened on the basis of properties. In the case of brazing to LSY. matching of expansion coefficients was judged to be the most significant property. Brazing was accomplished in a vacuum furnace with a typical thermal cycle of 5 minutes holding time at a temperature of about 50° C. above the braze liquidus temperature. Candidate systems of materials were brazed and shear tested to determine properties of coupled systems of materials.

The braze alloys considered were three GTE alloys, Cusil, Cusil ABA, and Nioro. Cusil, Cusil ABA, and Nioro are trademarks of Wesgo Division of GTE Products Corporation, Belmont, Calif.

TABLE 1

Characteristics of Selected GTE Wesgo Brazes

| ALLOY | COMPOSITION | LIQUIDUS TEMP. (°C.) | SOLIDUS TEMP. (°C.) |
|---|---|---|---|
| Cusil | 72 wt. % Ag<br>28 wt. % Cu | 780 | 780 |
| Cusil ABA | 63 wt. % Ag<br>35.25 wt. % Cu<br>1.75 wt. % Ti | 810 | 780 |
| Nioro | 82 wt. % Au<br>18 wt. % Ni | 950 | 950 |

Figure 4:
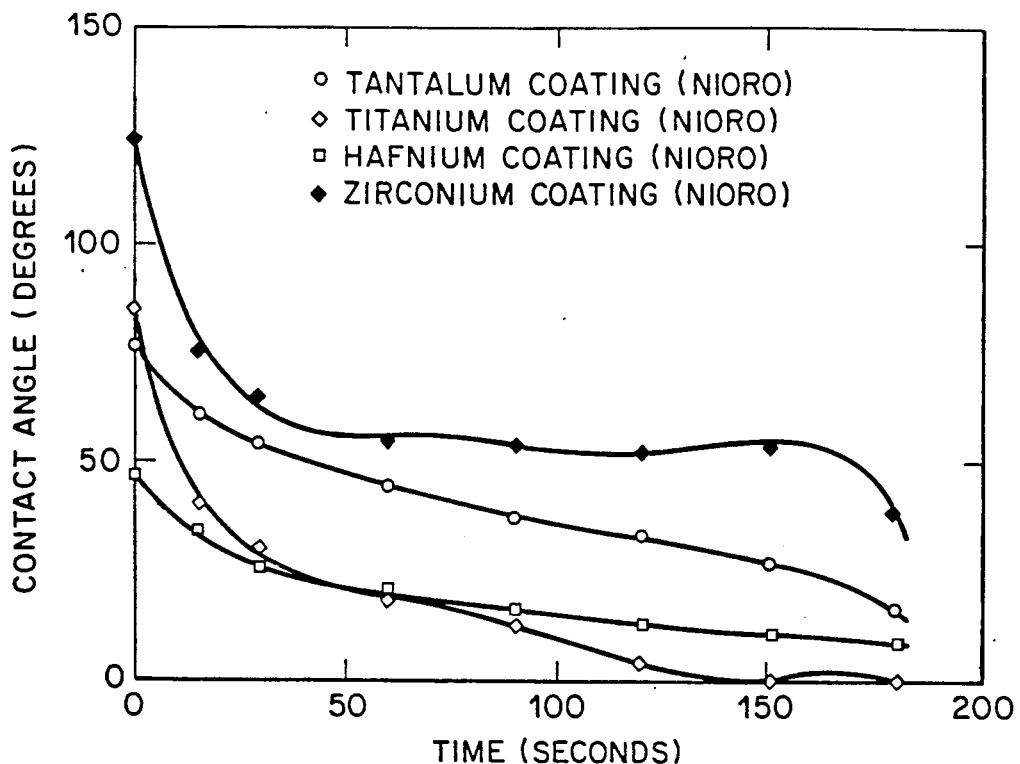
FIG. 4 is a graph of contact angle as a function of time for a gold-nickel braze on lanthana-strengthened yttria coated with different metals in accordance with the present invention.
Figure 5:
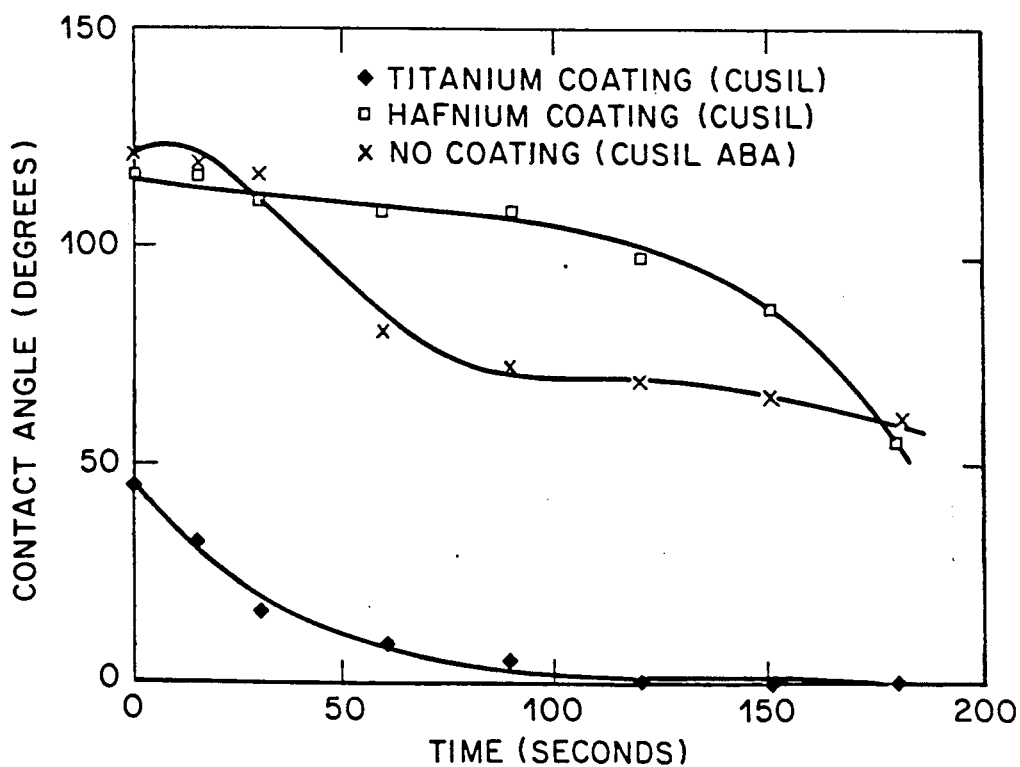
FIG. 5 is a graph of contact angle as a function of time for a copper-silver braze on a lanthana-strengthened yttria article coated with different metals and a copper-silver-titanium braze on an uncoated lanthana-strengthened yttria article in accordance with the present invention.

A series of sessile drop tests were performed on coated lanthana-strengthened yttria (LSY) substrates. The coatings used were Hf, Ta, Ti, and Zr. Contact angle versus time data were generated for the above coatings using Nioro braze. 82 w/o Au and 18 w/o Ni. Nioro is a trademark of Wesgo Division of GTE Products Corporation. Belmont. Calif. These results are shown in FIG. 4. All four coatings. Hf, Ta, Ti, and Zr, exhibited good wetting behavior at the end of the three minute test. Ti coating yielded a contact angle of about nine degrees in about 120 sec. Both the Ti and Hf coatings adhered well to the substrates prior to brazing with a uniform, shiny appearance. In contrast, the Ta and Zr coatings were patchy and non-uniform. However, the Ta and Zr coatings resulted in reasonable wetting angles of about 20 and 45 degrees, respectively. The wetting behavior of Cusil braze. 72 w/o Ag and 28 w/o Cu, on coated LSY substrates was also evaluated. Hf and Ti coatings were evaluated using the procedures described above. Ti coating yielded excellent wetting with a contact angle of zero degrees in 120 seconds. Hf coating resulted in wetting behavior with a contact angle of 55 degrees after 180 seconds. A test was made using Cusil ABA. 63 w/o Ag. 35.25 w/o Cu, and 1.75 w/o Ti. This brazing material offers the advantage of avoiding the necessity of coating the LSY which may be useful in the case of complex geometries of the articles. This material gave a wetting angle of 60 degrees after 180 seconds, indicating acceptable wetting behavior. These data are summarized in FIG. 5.

Brazed coupon pairs of LSY to metal were made to provide a means of measuring braze strength. Previous studies have demonstrated that residual stress reduces the level of shear strength obtained from brazed pairs. Consequently, candidate metals were selected on the basis of the closeness of their thermal expansion coefficients to that of LSY, Incoloy 909 (Huntington Alloys Fe-Ni-Co-Nb alloy) was considered to be a reasonable prospect while niobium was judged to be excellent. Relevant expansion coefficients are given in Table 2.

TABLE 2

Coefficient of Linear Thermal Expansion
(Room Temp. - 1000° C.) Reported in the Literature Alpha for LSY = $7.9 \times 10^{-6}$/°C.
Alpha for Incoloy 909 = 7.8 to $9.8 \times 10^{-6}$/°C.
Alpha for Nb = $8.2 \times 10^{-6}$/°C.

Brazed pairs of Incoloy 909 to LSY were made using Nioro on LSY (coated with either Ti or Hf). Additional pairs were made with Cusil ABA on uncoated LSY. The brazed alloy foil was 0.0051 cm thick. The brazed coupon pair samples were sheared in a specially designed fixture in order to minimize torque on the coupons and tensile component of stress on the braze. Nioro braze was ineffective with Incoloy 909 with the samples fracturing by thermal shock on cooling to room temperature. The Cusil ABA samples survived the brazing cycle and were sheared with a mean strength of about 1600 psi. This is considered reasonable compared with the shear strength values between 1600 psi and 3500 psi reported in the literature for molybdenum to silicon carbide brazed joints. All of these samples fractured in the ceramic, not at either the braze-ceramic or braze-Incoloy interface. This observation confirms the soundness of the braze and suggests that the joint strength is dependent on ceramic properties together with those factors in the braze joint which contribute to residual stress. The low yield stress of Cusil ABA made it relatively forgiving compared with Nioro. This proved to be critical given the differential expansion between Incoloy 909 and LSY.

Figure 3:
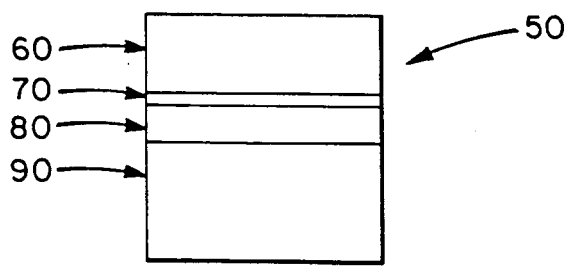
FIG. 3 is a cross sectional view of a brazing material in contact with a coated ceramic article and a metal article in accordance with the present invention.

An additional series of brazed pairs was made using niobium coupons brazed to LSY. Shown in FIG. 3 is layered structure 50 before heating. Layered structure 50 comprises LSY article 60 coated with Ti layer 70, Nioro braze 80, and niobium article 90 in which Nioro braze 80 is in contact with Ti layer 70 and niobium article 90. Use of Nioro braze with 3 microns Ti coated LSY resulted a shear strength level of about 1300 psi, respectively. Cusil braze was used with either Ti or Hf coating yielding 1600 and 1500 psi, respectively. Cusil ABA braze on uncoated LSY gave a strength level of 1300 psi based on four samples. Table 3 gives a summary of the shear test results. An average of two specimens for each value was reported, except where noted. It can concluded that it is possible to obtain shear strengths of about 1500 psi in niobium to LSY joints brazed under a variety of conditions.

TABLE 3

Summary of Brazed Coupon Shear Test Results

| | BRAZE | COATING | SHEAR STRENGTH (psi) |
|---|---|---|---|
| LSY to Incoloy 909 Joints | Nioro | Hf | 0 |
| | Nioro | Ti | 0 |
| | Cusil ABA | None | 1600 |
| LSY to Niobium Joints | Nioro | Ti | 1300 |
| | Cusil | Hf | 1500 |
| | Cusil | Ti | 1600 |
| | Cusil ABA | None | 1300 |

A new and improved ceramic-metal article 10, shown in FIG. 1, is one preferred embodiment of the invention which comprises infrared transparent lanthana-strengthened yttria dome 20 approximately 7.1 centimeters outside diameter, bonded to niobium metal sheet 30 with brazing material 40, such as Cusil ABA. a copper-silver alloy containing titanium. Cusil ABA is a brazing alloy trademark of the Wesgo Division of GTE Products Corporation. Belmont Calif. Niobium was the metal selected because of the excellent thermal expansion match to lanthana-strengthened yttria. Brazing alloy. Cusil ABA, was used as the brazing material because of its good adhesion, wetting capability, and titanium content which eliminates the need to coat the edge of the LSY dome with titanium. The service temperature of ceramic-metal article 10 is greater than 250 degrees centigrade and less than the solidus temperature of brazing material 40. In addition, a ceramic-metal article can be made from a ceramic coated with a metal, such as Ti, Hf, Zr, and Ta, bonded to a metal article, such as niobium by a braze material containing a metal, such as Ti, Hf, Zr, and Ta.

A 4.57 cm diameter ring of Incoloy 909 was fabricated for brazing to a small LSY dome (4.06 cm outside diameter). This attempt was unsuccessful. Although adhesion between the dome and the metal ring was good, the dome shattered on cooling. The ring thickness was 0.17 cm which, together with the differential expansion of the materials, resulted in an excessive level of residual stress.

A demonstration braze was undertaken in which a full-size LSY dome (7.1 cm outside diameter) was joined to a 0.25 mm thick niobium disk. The metal selection was made on the basis of the excellent thermal expansion match to LSY and consideration of shear test results. Cusil ABA was used because of the demonstrated adhesion and wetting capability of Ti in this system and the need to avoid the difficulties of coating the edge of a dome. The sample was put through a thermal cycle in which heating and cooling were less than 10° C./min. to minimize thermal shock to the dome.

The full-size LSY dome brazed to niobium is shown in FIG. 1. Good wetting and adhesion was obtained around the periphery of the dome as evidenced by the uniformity of the fillet. No evidence of physical damage or loss of transparency of the ceramic as a result of the brazing operation was observed.

The feasibility of the fabrication of a yttria based ceramic-metal article by brazing was demonstrated. Wetting and adhesion between both Nioro and Cusil braze alloys and LSY were obtained by coating the ceramic with either Ti or Hf. Incorporation of Ti in the braze as in Cusil ABA was effective. Niobium was selected the most appropriate metal to bond to LSY because of its expansion match. The shear strengths of coupon samples of niobium brazed to LSY were about 1500 psi and are considered reasonable. Finally a full-size LSY dome was successfully brazed to niobium sheet.

While there has been shown and described what is at present considered the preferred embodiment of the invention, it will be obvious to those skilled in the art that various changes and modifications may be made therein without departing from the scope of the invention as defined by the appended claims.

What is claimed is:

1. A ceramic-metal article comprising a ceramic article bonded to a metal article by a layer of brazing material, said ceramic-metal article having a service temperature, said ceramic article having a liquidus temperature, a solidus temperature, and a coefficient of thermal expansion, said ceramic article comprising approximately 3.2 mole percent to about 30 mole percent of lanthana added to yttria, said metal article having a liquidus temperature, a solidus temperature, and a coefficient of thermal expansion essentially equal to the coefficient of thermal expansion of said ceramic article, said brazing material comprising a ductile metal containing a group IVB metal, said brazing material having a liquidus temperature less than said solidus temperature of said ceramic article and said solidus temperature of said metal article, and said brazing material having a solidus temperature above said service temperature of said ceramic-metal article.

2. A ceramic-metal article in accordance with claim 1 wherein said group IVB metal is selected from the group consisting of titanium, hafnium, and combinations thereof.

3. A ceramic-metal article in accordance with claim 1 wherein said brazing material comprises a brazing alloy consisting essentially of 63% by weight silver, 35.25% by weight copper, and 1.75% by weight titanium.

4. A ceramic-metal article in accordance with claim 1 wherein said metal article comprises a niobium article.

5. A ceramic-metal article in accordance with claim 1 wherein said service temperature of said ceramic-metal article is greater than about 250 degrees centigrade and less than said solidus temperature of said brazing material.

6. A ceramic-metal article in accordance with claim 1 wherein said ceramic article comprises an infrared transparent dome.

7. A ceramic-metal article comprising a lanthana-strengthened yttria dome comprising approximately 3.2 mole percent to about 30 mole percent lanthana added to yttria bonded to a niobium article by a layer of brazing material, said layer of brazing material comprising a ductile metal foil containing a metal selected from the group consisting of titanium, hafnium, zirconium, tantalum, and combinations thereof.

8. A ceramic-metal article comprising a ceramic article bonded to a metal article by a layer of brazing material, said ceramic-metal article having a service temperature, said ceramic article having a liquidus temperature, a solidus temperature, and a coefficient of thermal expansion, said ceramic article comprising approximately 3.2 mole percent to about 30 mole percent lanthana added to yttria selectively coated with a group IVB metal, said metal article having a liquidus temperature, a solidus temperature, and a coefficient of thermal expansion essentially equal to the coefficient of thermal expansion of said ceramic article, said brazing material comprising a ductile metal, said brazing material having a liquidus temperature less than said solidus temperature of said ceramic article and said solidus temperature of said metal article, and said brazing material having a solidus temperature above said service temperature of said ceramic-metal article.

9. A ceramic-metal article in accordance with claim 8 wherein said group IVB metal is selected from the group consisting of titanium, hafnium, and combinations thereof.

10. A ceramic-metal article in accordance with claim 8 wherein said brazing material is selected from a group of brazing alloys consisting of 72% by weight silver and 28% by weight copper, 82% by weight gold and 18% by weight nickel, and combinations thereof.

11. A ceramic-metal article in accordance with claim 8 wherein said metal article comprises a niobium article.

12. A ceramic-metal article in accordance with claim 8 wherein said service temperature of said ceramic-metal article is greater than about 250 degrees centigrade and less than said solidus temperature of said brazing material.

13. A ceramic-metal article in accordance with claim 8 wherein said ceramic article comprises an infrared transparent dome.

14. A ceramic-metal article comprising a lanthana-strengthened yttria dome comprising approximately 3.2 mole percent to about 30 mole percent lanthana added to yttria selectively coated with a metal selected from the group consisting of titanium, hafnium, zirconium, tantalum, and combinations thereof boned to a niobium article by a layer of brazing material, said layer of brazing material comprising a ductile metal foil.

15. A ceramic-metal article in accordance with claim 14 wherein said layer of brazing material comprises a ductile metal containing a metal selected from the group consisting of titanium, hafnium, zirconium, tantalum, and combinations thereof.

* * * * *